United States Patent [19]

Teach

[11] 3,857,947

[45] Dec. 31, 1974

[54] FUNGICIDAL ACTIVE PHTHALIMIDES

[75] Inventor: Eugene G. Teach, El Cerrito, Calif.

[73] Assignee: Stauffer Chemical Company, New York, N.Y.

[22] Filed: Apr. 20, 1973

[21] Appl. No.: 353,167

Related U.S. Application Data

[60] Continuation-in-part of Ser. No. 280,294, Aug. 14, 1972, abandoned, and a continuation-in-part of Ser. No. 227,274, Feb. 17, 1972, abandoned, said Ser. No. 280,294, is a continuation-in-part of Ser. No. 219,131, Jan. 19, 1972, abandoned, Division of Ser. No. 63,909, Aug. 3, 1970, abandoned, and a continuation-in-part of Ser. No. 227,274, Feb. 17, 1970, abandoned.

[52] U.S. Cl......... 424/274, 260/326 H, 260/326 N, 260/326 S, 424/DIG. 8
[51] Int. Cl............................................. A01n 9/22
[58] Field of Search...................... 424/274, DIG. 8; 260/326 N, 326 S, 326 H

[56] References Cited
OTHER PUBLICATIONS
Khovratovich et al., Chem. Abst., Vol. 60, p. 2449 (1964).

Primary Examiner—Albert T. Meyers
Assistant Examiner—Allen J. Robinson
Attorney, Agent, or Firm—Daniel C. Block

[57] ABSTRACT

Compositions that are fungicidally active are described herein along with the method of utility. The compositions contain a compound corresponding to the formula

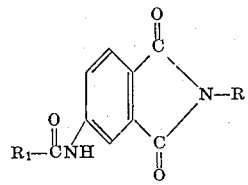

wherein R is selected from alkyl, alkenyl, alkynyl and thiochloroalkyl, and $R_1$ is selected from alkyl, thioalkyl, cycloalkyl, alkenyl and aminoalkyl.

26 Claims, No Drawings

FUNGICIDAL ACTIVE PHTHALIMIDES

CROSS REFERENCE TO RELATED APPLICATION

This application is a continuation-in-part of application Ser. No. 280,294, filed Aug. 14, 1972, and application Ser. No. 227,274, filed Feb. 17, 1972 both now abandoned. Application Ser. No. 280,294 is a continuation-in-part of application Ser. No. 219,131, filed Jan. 19, 1972, now abandoned, which was a divisional application of application Ser. No. 63,909, filed Aug. 3, 1970, now abandoned. Application Ser. No. 227,274 is a continuation-in-part of said application Ser. No. 63,909.

DESCRIPTION OF THE INVENTION

The present invention is concerned with fungicidal active compositions having a novel group of compounds which can be generally described as substituted phthalimide derivatives and an inert adjuvant carrier.

The compounds are represented by the general formula

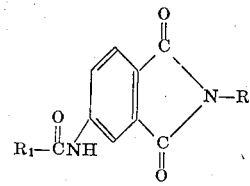

wherein R can be alkyl having from 1–15 carbon atoms, preferably 1–12 carbon atoms, alkenyl having from 2–4 carbon atoms, alkynyl having from 2–3 carbon atoms and thiochloroalkyl having from 1–4 carbon atoms, and $R_1$ can be selected from the group consisting of alkyl having from 1–8 carbon atoms, preferably 1–6 carbon atoms, thioalkyl having from 1–4 carbon atoms, cycloalkyl having from 3–6 carbon atoms, alkenyl having from 2–3 carbon atoms and aminoalkyl having from 1–4 carbon atoms.

The compounds represented by the above formula are synthesized by reacting a nitro substituted phthalic anhydride with an alkyl amine in the presence of a suitable solvent. This reaction product is reduced to form an amino substituted alkyl phthalimide intermediate. The intermediate is treated with a suitable reagent to form the desired product.

In order to illustrate the merits of the present invention, the following examples are provided:

EXAMPLE 1

4-Nitrophthalic Anhydride

4-Nitrophthalic anhydride was prepared as described in Organic Synthesis Collective Vol. I, p. 410, from 4-nitrophthalic acid and acetic anhydride.

EXAMPLE 2

4-Nitro-N-t-butyl Phthalimide

Eighty-eight grams of 4-nitrophthalic anhydride was dissolved in 300 ml. of benzene and 33 g. of t-butyl amine was added dropwise with stirring.

To the clear solution was added 75 ml. of thionyl chloride dropwise with continued stirring. A copious precipitate formed and additional benzene was added to continue stirring. The mixture was heated to reflux, HCl and $SO_2$ came off and the mixture became clear. The mixture was cooled and a small amount of white ppt was filtered off and the benzene removed under vacuum to give a white solid. The main product was washed with ~1% NaOH and water and dried to give 65 g. of product, m.p. 123°–125°C.

EXAMPLE 3

4-Amino-N-t-butyl Phthalimide

Sixty grams of 4-nitro-N-t-butyl phthalimide were added portionwise to 45 g. of powdered iron and 3 ml. of conc. HCl in a solvent mixture of 200 ml. of ethyl alcohol and 160 ml. of water to maintain the mixture at reflux. When addition was complete, the mixture was stirred and allowed to cool for five minutes and then neutralized with 3 g. of 50% NaOH solution. The iron oxide was filtered off and the solvents removed under vacuum to give 47 g. of yellow solid product, m.p. 161°–163°C.

EXAMPLE 4

4-Propionamido-N-t-butyl Phthalimide

Ten and nine-tenths grams of 4-amino-N-t-butyl phthalimide were treated with 6.6 g. of propionic anhydride containing 1–2 drops of sulfuric acid. The mixture was poured into water when reaction was complete, ground in a Waring blender with ~1% NaOH solution, filtered, washed and dried to give 12.7 g. of product, m.p. 153°–155°C.

EXAMPLE 5

N-S-Methylthiocarbanyl-N-t-butyl Phthalimide

Ten and nine-tenths grams of 4-amino-N-t-butyl phthalimide was dissolved in 100 ml. of acetone. Then, 5.5 g. of triethylamine was added. Thereafter, 5.6 g. of methylchlorothiolformate were added thereto. The reaction mixture was worked up in a similar manner as set forth in Example 4 to give 12.0 g. of product, m.p. 121°–126°C.

EXAMPLE 6

4-Cyclopropane Carboxamido-N-t-butyl Phthalimide

Eight and seven-tenths grams of 4-amino-N-t-butyl phthalimide were dissolved in 100 ml. of acetone. Then, 4.5 g. of triethylamine were added. Thereafter, 4.2 g. of cyclopropyl carbonyl chloride were added to the mixture. The solution was refluxed for 30 minutes and then worked up in a similar manner as set forth in Example 4 to yield 11.3 g. of product, m.p. 123°–125°C.

EXAMPLE 7

4-Crotonamido-N-t-butyl Phthalimide

Eight and seven-tenths grams of 4-amino-N-t-butyl phthalimide were dissolved in 100 ml. of acetone. Then, 4.5 g. of triethylamine were added. Thereafter, 4.2 g. of crotonoyl chloride were added. The reaction product was worked up in a similar manner as set forth in Example 4 to yield 10.8 g. of product, m.p. 95°–99°C.

EXAMPLE 8

4-Ethylureido-N-t-butyl Phthalimide

Eight and seven-tenths grams of 4-amino-N-t-butyl phthalimide was dissolved in 100 ml. of acetonitrile. Then, 3 g. of ethyl isocyanate was added along with a mixture of about 100 mg. of triethylene diamine and about 100 mg. of dibutyl tin dilaurate as catalyst. The mixture was refluxed for 6 hours. The reaction product was then worked up in a similar manner as set forth in Example 4 to yield 12.2 g. of product, $n_D^{30}$ - 1.5674.

EXAMPLE 9

4-Propionamido-N-allyl Phthalimide

Eighty ml. of a solution containing 0.04 moles of the sodium salt of 4-propionamido phthalimide in dimethylformamide was reacted with 5.0 g. of allyl bromide at reflux temperature for 30 minutes. The reaction product was worked up in a similar manner as set forth in Example 4 to yield 9.6 g. of product, m.p. 152°–154°C.

EXAMPLE 10

4-Propionamido-N-propargyl Phthalimide

Eighty ml. of a solution containing 0.04 moles of the sodium salt of 4-propionamido phthalimide in dimethylformamide was reacted with 5.0 g. of propargyl bromide at reflux temperature for 30 minutes. The reaction product was worked up in a similar manner as set forth in Example 4 to yield 9.5 g. of product, m.p. 241°–242°C.

EXAMPLE 11

4-Methylureido-N-trichloromethyl Sulfenyl Phthalimide

Eight and eight-tenths grams of the sodium salt of 4-methylureido phthalimide was dissolved in 100 ml. of dimethylformamide. Then, 7.4 g. of trichloromethyl sulfenyl chloride was added portionwise thereto. The reaction product was worked up in a similar manner as set forth in Example 4 to yield 10.5 g. product, m.p. dec. 148°C.

Other compounds were prepared in an analogous manner starting with the appropriate starting materials, as outlined above. The following is a table of compounds representative of those embodied by the present invention. Compound numbers have been assigned to them and are used for identification throughout the balance of the specification.

TABLE I

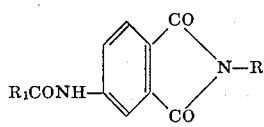

| Compound number | R₁ | R |
|---|---|---|
| 1 | C₂H₅— | t-C₄H₉ |
| 2 | CH₃NH— | t-C₄H₉ |
| 3 | C₃H₇C(CH₃)₂— | t-C₄H₉ |
| 4 | CH₃S— | t-C₄H₉ |
| 5 | CH₃— | t-C₄H₉ |
| 6 | CH₂⟩HC—  CH₂ (cyclopropyl) | t-C₄H₉ |
| 7 | C₃H₇-i- | t-C₄H₉ |
| 8 | CH₃CH=CH— | t-C₄H₉ |
| 9 | (CH₃)₃C— | t-C₄H₉ |
| 10 | C₂H₅NH— | t-C₄H₉ |
| 11 | C₂H₅— | —C₂H₅ |
| 12 | C₂H₅— | —n—C₃H₇ |
| 13 | C₂H₅— | i-C₃H₇ |
| 14 | C₂H₅— | —CH₂CH=CH₂ |
| 15 | C₂H₅— | —CH₂C≡CH |
| 16 | C₂H₅— | -n-C₄H₉ |
| 17 | C₂H₅— | -i-C₄H₉ |
| 18 | C₂H₅— | -n-C₅H₁₁ |
| 19 | C₂H₅— | -n-C₆H₁₃ |
| 20 | C₂H₅— | -n-C₇H₁₅ |
| 21 | C₂H₅— | -n-C₈H₁₇ |
| 22 | C₂H₅— | -n-C₁₂H₂₅ |
| 23 | C₄H₉-n-NH— | -n-C₄H₉ |
| 24 | CH₃NH— | —n-C₈H₁₇ |
| 25 | CH₃NH— | —SCCl₃— |

FUNGICIDAL TESTING PROCEDURE

A. Foliar Preventative Sprays

1. Bean Rust

The chemicals are dissolved in an appropriate solvent and diluted with water containing several drops of Tween-20, a wetting agent. Test concentrations, ranging from 1000 ppm downward, are sprayed to runoff on the primary leaves of pinto beans (*Phaseolus vulgaris* L.). After the leaves are dried, they are inoculated with a water suspension of spores of the bean rust fungus (*Uromyces Phaseoli* Arthur) and the plants are placed in an environment of 100% humidity for 24 hours. The plants are then removed from the humidity chamber and held until disease pustules appear on the leaves. Effectiveness is recorded as percent reduction in number of pustules as compared to untreated inoculated plants.

2. Bean Powdery Mildew

Test chemicals are prepared and applied in the same manner as for the bean rust test. After the plants are dry, the leaves are dusted with spores of the powdery mildew fungus (*Erysiphe polygoni* De Candolle) and the plants are retained in the greenhouse until the fungal growth appears in the leaf surface. Effectiveness is recorded as percent of the leaf surface free of fungal growth as compared to untreated inoculated plants.

3. Tomato Early Blight

Test chemicals are prepared and applied in the same manner as the bean rust and powdery mildew tests except that 4-week old tomato (*Lycopersicon esculentum*) plants are utilized as the host plant. When the leaves are dry, they are inoculated with a water suspension of spores of the early blight fungus (*Alternaria solani* Ellis and Martin) and placed in an environment of 100% humidity for 48 hours. The plants are then removed from the humidity chamber and held until disease lesions appear on the leaves. Effectiveness is recorded as percent reductions in number of lesions as compared to untreated inoculated plants.

B. Tube Systemic Test

1. Bean Rust

The chemicals are dissolved in an appropriate solvent and diluted with tap water to a series of descending concentrations beginning at 50 ppm. Sixty ml. of each concentration are placed in a test tube. A pinto bean plant is placed in each tube and supported with a piece of cotton so that only the roots and lower stem are in contact with the test solution. Forty-eight hours later the bean leaves are inoculated with a water suspension of spores of the bean rust fungus and placed in an environment with 100% humidity for 24 hours. The plants are then removed from the humidity chamber and maintained in the greenhouse until the disease pustules appear on the leaves. Effectiveness is recorded as the lowest concentration, in ppm, which will provide 50% reduction in pustule formation as compared to untreated, inoculated plants.

2. Bean Powdery Mildew

Test chemicals are prepared and applied in the same manner as for the bean rust systemic test. After 2 days the leaves are dusted with spores of the powdery mildew fungus and maintained in greenhouse until mycelial growth appears in the leaf surfaces. Effectiveness is recorded as the lowest concentration, in ppm, which will provide a 50% reduction in mycelial growth on the leaf surface as compared to untreated, inoculated plants.

The results of these tests are tabulated below.

TABLE II

| Compound Number | Rust 1000 | Rust 500 | Rust 100 | Preventative Sprays ppm Mildew 1000 | Mildew 500 | Mildew 100 | Tomato Blight 1000 | Tomato Blight 500 | Tomato Blight 100 | Tube Systemic ppm Rust | Tube Systemic ppm Mildew |
|---|---|---|---|---|---|---|---|---|---|---|---|
| 1 | 100 | 100 | 100 | 0 | 0 | 0 | 75 | 25 | 0 | (0.25) | >50 |
| 2 | 100 | 100 | 100 | 0 | | | 25 | 0 | 0 | 1 | |
| 3 | 0 | | | 0 | | | | | | | |
| 4 | 100 | 100 | 25 | 0 | | | 90 | 80 | 0 | >50 | |
| 5 | 100 | 100 | 25 | 0 | | | 25 | 0 | 0 | 1 | |
| 6 | 100 | 100 | 100 | 50 | | | 0 | 0 | 0 | 5 | |
| 7 | 100 | 100 | 100 | 50 | | | 25 | 0 | 0 | 5 | |
| 8 | 95 | 90 | 50 | 0 | | | | | | | |
| 9 | 100 | 100 | 98 | 0 | | | 0 | 0 | 0 | 5 | |
| 10 | 100 | 100 | 50 | 0 | | | 50 | 25 | 0 | 10 | |
| 11 | 100 | 100 | 75 | 0 | | | 0 | 0 | 0 | 10 | |
| 12 | 100 | 100 | 100 | 0 | | | 50 | 25 | 0 | 5 | |
| 13 | 100 | 100 | 99 | 0 | | | 75 | 25 | 0 | 5 | |
| 14 | 100 | 100 | 80 | 0 | | | 0 | 0 | 0 | 10 | |
| 15 | 75 | 60 | 25 | 0 | | | | | | >50 | |
| 16 | 100 | 100 | 100 | 0 | | | 0 | 0 | 0 | 25 | |
| 17 | 100 | 100 | 100 | 0 | | | 0 | 0 | 0 | 5 | |
| 18 | 100 | 100 | 90 | 0 | | | 0 | 0 | 0 | >50 | |
| 19 | 100 | 100 | 100 | 0 | | | 0 | 0 | 0 | >50 | |
| 20 | 100 | 100 | 95 | 0 | | | 0 | 0 | 0 | >50 | |
| 21 | 100 | 100 | 98 | 0 | | | 0 | 0 | 0 | >50 | |
| 22 | 50 | 25 | 0 | 0 | | | | | | >50 | |
| 23 | 80 | 75 | 0 | 0 | | | | | | >50 | |
| 24 | 95 | 90 | 75 | 0 | | | 0 | 0 | 0 | >50 | |
| 25 | 90 | 50 | 0 | 0 | | | | | | >50 | |

As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media although it may be convenient to dissolve the toxicant directly in a solvent such as kerosene, fuel oil, xylene, alkylated naphthalenes or the like and use such organic solutions directly. However, the more common procedures is to employ dispersions of the toxicant in an aqueous medium and such compositions may be produced by forming a concentrated solution of the toxicant in a suitable organic solvent followed by dispersion in water, usually with the aid of surface active agents. The latter, which may be anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol fatty acid esters, and other polyoxyethylene surface active agents. The proportion of these agents commonly comprises 1–15% by weight of the pesticidal compositions although the proportion is not critical and may be varied to suit any particular situation.

What is claimed is:

1. A method of controlling fungi consisting of contacting the fungi to be controlled with a fungicidally effective amount of a compound having the formula:

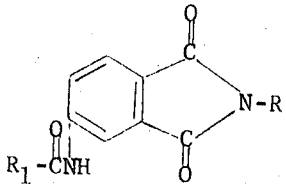

wherein R is selected from the group consisting of alkyl having from 1–15 carbon atoms, alkenyl having from 2–4 carbon atoms, alkynyl having from 2–3 carbon atoms and thiochloromethyl, and $R_1$ is selected from the group consisting of alkyl having from 1–8 carbon atoms, thiomethyl, cyclopropyl, alkenyl having from 2–3 carbon atoms and aminoalkyl having from 1–4 carbon atoms.

2. The method of claim 1 wherein R is $t-C_4H_9$ and $R_1$ is $C_2H_5-$.

3. The method of claim 1 wherein R is $t-C_4H_9$ and $R_1$ is $CH_3NH-$.

4. The method of claim 1 wherein R is $t-C_4H_9$ and $R_1$ is $C_3H_7C(CH_3)_2-$.

5. The method of claim 1 wherein R is $t-C_4H_9$ and $R_1$ is $CH_3S-$.

6. The method of claim 1 wherein R is $t-C_4H_9$ and $R_1$ is $CH_3-$.

7. The method of claim 1 wherein R is $t-C_4H_9$ and $R_1$ is

8. The method of claim 1 wherein R is $t-C_4H_9$ and $R_1$ is $C_3H_7-i-$.

9. The method of claim 1 wherein R is $t-C_4H_9$ and $R_1$ is $CH_3CH=CH-$.

10. The method of claim 1 wherein R is $t-C_4H_9$ and $R_1$ is $(CH_3)_3C-$.

11. The method of claim 1 wherein R is $t-c_4H_9$ and $R_1$ is $C_2H_5NH-$.

12. The method of claim 1 wherein R is $-C_2H_5$ and $R_1$ is $C_2H_5-$.

13. The method of claim 1 wherein R is $-n-C_3H_7$ and $R_1$ is $C_2H_5-$.

14. The method of claim 1 wherein R is $-i-C_3H_7$ and $R_1$ is $C_2H_5-$.

15. The method of claim 1 wherein R is $-CH_2CH=CH_2$ and $R_1$ is $C_2H_5-$.

16. The method of claim 1 wherein R is $-CH_2C\equiv CH$ and $R_1$ is $C_2H_5-$.

17. The method of claim 1 wherein R is $-n-C_4H_9$ and $R_1$ is $C_2H_5-$.

18. The method of claim 1 wherein R is $-i-C_4H_9$ and $R_1$ is $C_2H_5-$.

19. The method of claim 1 wherein R is $-n-C_5H_{11}$ and $R_1$ is $C_2H_5-$.

20. The method of claim 1 wherein R is $-n-C_6H_{13}$ and $R_1$ is $C_2H_5-$.

21. The method of claim 1 wherein R is $-n-C_7H_{15}$ and $R_1$ is $C_2H_5-$.

22. The method of claim 1 wherein R is $-n-C_8H_{17}$ and $R_1$ is $C_2H_5-$.

23. The method of claim 1 wherein R is $-n-C_{12}H_{25}$ and $R_1$ is $C_2H_5-$.

24. The method of claim 1 wherein R is $-n-C_4H_9$ and $R_1$ is $C_4H_9-n-NH-$.

25. The method of claim 1 wherein R is $-n-C_8H_{17}$ and $R_1$ is $CH_3NH-$.

26. The method of claim 1 wherein R is $-SCCl_3$ and $R_1$ is $CH_3NH-$.

* * * * *